US007926796B2

(12) United States Patent
Clark

(10) Patent No.: US 7,926,796 B2
(45) Date of Patent: Apr. 19, 2011

(54) BRACING MEANS

(75) Inventor: Brynley Clark, Bristol (GB)

(73) Assignee: Rolls-Royce PLC, London (GB)

( * ) Notice: Subject to any disclaimer, the term of this patent is extended or adjusted under 35 U.S.C. 154(b) by 275 days.

(21) Appl. No.: 12/289,744

(22) Filed: Nov. 3, 2008

(65) Prior Publication Data

US 2009/0057972 A1 Mar. 5, 2009

Related U.S. Application Data

(62) Division of application No. 11/304,768, filed on Dec. 16, 2005, now abandoned.

(30) Foreign Application Priority Data

Dec. 24, 2004 (GB) .................................. 0428374.3
Nov. 18, 2005 (GB) .................................. 0523452.1

(51) Int. Cl.
*B23B 31/30* (2006.01)

(52) U.S. Cl. ...... 269/22; 269/20; 254/93 HP; 254/89 H; 29/559

(58) Field of Classification Search .................... 269/22, 269/21, 20, 329; 254/93 HP, 93 R, 89 HP, 254/89 H; 279/4.03; 29/559
See application file for complete search history.

(56) References Cited

U.S. PATENT DOCUMENTS

| | | | | |
|---|---|---|---|---|
| 3,253,854 | A | 5/1966 | Hollander | |
| 3,822,861 | A * | 7/1974 | Scott | 254/93 HP |
| 3,990,464 | A * | 11/1976 | Jenkins | 137/1 |
| 4,077,610 | A | 3/1978 | Masuda | |
| 4,294,141 | A * | 10/1981 | Miller | 81/488 |
| 4,542,882 | A * | 9/1985 | Choe | 254/93 HP |
| RE32,939 | E | 6/1989 | Gardner et al. | |
| 4,948,107 | A * | 8/1990 | Orndorff, Jr. | 254/93 HP |
| 5,820,117 | A | 10/1998 | Thompson et al. | |
| 6,092,788 | A * | 7/2000 | Simon | 254/93 HP |
| 6,511,046 | B1 * | 1/2003 | Solakian | 254/93 HP |
| 6,513,418 | B1 * | 2/2003 | Simmons et al. | 92/92 |

FOREIGN PATENT DOCUMENTS

| | | | |
|---|---|---|---|
| DE | 1 897 897 | U | 7/1964 |
| FR | 2 606 851 | A1 | 5/1988 |
| GB | 2 170 126 | A | 7/1986 |
| GB | 2 196 275 | A | 4/1988 |

* cited by examiner

*Primary Examiner* — Lee D Wilson
(74) *Attorney, Agent, or Firm* — Oliff & Berridge, PLC

(57) ABSTRACT

Bracing means for supporting a moveably mounted or flexible component during a machining operation that has an expandable member adapted to fit between a component and a support surface. When the expandable member is expanded a bracing member will resist movement and/or flexing of the component caused by forces arising during the machining operation. The expandable member is deformable to substantially conform to the shape of the component and the support surface.

4 Claims, 3 Drawing Sheets

BRACING MEANS

This application is a division of U.S. patent application Ser. No. 11/304,768, filed Dec. 16, 2005, now abandoned the entire contents of which are hereby incorporated by reference.

The invention relates to bracing means.

In particular it relates to bracing means for supporting a moveably mounted or flexible component during a machining operation.

BACKGROUND

Rotor blades in turbomachinery occasionally suffer minor Foreign Object Damage (FOD). This need not necessitate the replacement of the whole component, but the aerodynamic surface of the blade must be restored to ensure optimum operation of the blade. This causes a problem where the rotor blade is fixed in position inside an engine assembly. While the engine can be stripped down to allow for the temporary removal of the blade while it is machined, it is often preferable to machine the blade "in-situ" to avoid lengthy engine down time. Such machining can be achieved easily manually if the blade can be reached from an engine inlet or exit. If the blade is inaccessible then conventional blending by hand may not be possible. Under these circumstances a device can be inserted through a boroscope hole with a small powered grinding wheel at its end. This enables grinding and blending of notches to be carried out remotely. The process can prove difficult because of the nature of blade mounting, which, at rest, tends to leave the blade loosely mounted. Hence as the blade is ground it may begin to chatter through lack of support or damping. Alternatively, because of the size or geometry of the blade, it may be relatively flexible, and so the blade may flex away from the blending tool as pressure is applied during the machining process. The effectiveness of the grinding operation is therefore reduced.

SUMMARY

Hence a means for supporting a rotor blade, or the like, which enables a machining operation on the blade to be executed while the blade is still fitted inside the engine, is extremely desirable.

According to a first aspect of the present invention there is provided a bracing means for supporting a moveably mounted or flexible component during a machining operation comprising an expandable member adapted to fit between the component and a support surface such that when the member is expanded the bracing means will resist movement and/or flexing of the component caused by forces arising during the machining operation, and the expandable member is deformable to substantially conform to the shape of the component and support surface.

Hence the invention provides a means for bracing a rotor blade or the like. The bracing means is guided to a position between the rotor blade to be machined and an adjacent rotor blade. An expandable member which forms part of the bracing means is expanded and is made of a flexible material such that it conforms substantially to the shape of both blades (ie the component to be machined and the support surface). Thus the bracing means acts to brace one blade against the other by preventing the blades moving relative to one another and/or their mountings. Use of such a device will enable components to be better machined in situ (ie whilst still fitted to the engine). It could also be used where the whole rotor blade assembly has been removed from the engine but it is not desirable to remove the blade from its mountings.

Preferably the expandable member is expandable by fluid. That is to say, the expandable member can be inflated by filling it with a gas or liquid supplied from some suitable source of pressurised fluid such as a gas canister, air or water pump, or produced by some chemical means.

Preferably the bracing means further comprises a fluid supply tube arranged in flow communication with the expandable member. The fluid employed to inflate the expandable member is supplied via the fluid supply tube. Likewise, when the bracing means is to be removed, the fluid can be exhausted from the expandable member through the fluid supply tube. The fluid may also be exhausted by some other appropriate means, such as a valve provided in the wall of the expandable member.

Preferably in a non expanded state the expandable member is located substantially within the fluid supply tube. Hence the expandable member is stored at least within the fluid supply tube when it is not in use and when it is being threaded through the engine. In the latter case this allows the bracing means to be passed through the engine without snagging the expandable member and thereby reduces the risk of abrasion or puncture damage.

Preferably the bracing means further comprises a support member, with said expandable member provided substantially towards one end of the support member. With the expandable member at or towards one end of the support member, it is easier to guide the expandable member to its target location. It also allows for the expandable member to inflate unhindered and conform to the shape of the component and the support surface without the support member being pressed up against one or other of the surfaces.

Preferably the fluid supply tube forms at least part of a support member. In such a configuration, where the support member also acts as a fluid supply tube, in that it is hollow and allows for the passage of fluid along it to the expandable member, the bracing means has a smaller cross-sectional area and hence occupies less space. The result of this is that the bracing means can pass through smaller gaps and flex as required, thereby enabling it to reach a larger number of target destinations. The support member may be provided as a rigid or flexible tube as required.

Preferably the bracing means is configured to react in response to varying forces arising during the machining operation. That is to say, the bracing means partly comprises a control system which monitors the fluid pressure, compression and/or movement of the expandable member and adjusts the fluid pressure accordingly to inhibit further movement of the component relative to the support surface.

According to a second aspect of the present invention there is provided a method of supporting a moveably mounted or flexible component during a machining operation on the component comprising the steps of:

a) inserting bracing means between the component and a support surface;

b) expanding a flexible expandable member provided on said bracing means between the component and the support surface such that the expandable member substantially conforms to the shape of the component and the support surface and the bracing means will resist movement and/or flexing of the component caused by forces arising during the machining operation.

The invention provides a method for bracing a rotor blade, or the like, which includes moving an expandable member into position between a component and a support surface. The expandable member is inflated and conforms substantially to the shape of the blade to be machined and the blade to be used as a support surface and acts to brace one against the other by preventing the blades moving relative to one another and/or their mountings.

The bracing means is removed from between the support surface and the component by deflating the expandable member and withdrawing the bracing means.

Preferably the expandable member is inflated by supplying the said expandable member with fluid. That is to say, the expandable member is filled, in part at least, with fluid to cause it to expand and conform, in part at least, to the shape of the component and support surface.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF EMBODIMENTS

Figure 1:
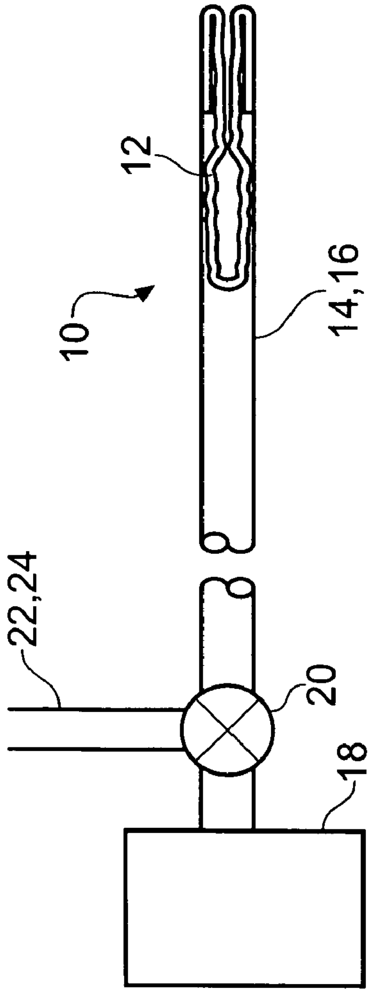
FIG. 1 shows a bracing means according to the present invention with an expandable member in a contracted state, with the whole device shown connected to a pressure source and valve arrangement.

Show in FIG. 1 is a bracing means 10 comprising an expandable member 12 provided substantially towards one end of, and in flow communication with, a support member 14. In FIG. 1 the expandable member 12 is shown in a non expanded state and located substantially within the support member 14. In this embodiment the support member 14 is hollow and, in use, acts as a fluid supply tube 16. The fluid supply tube 16 is in flow communication with a pressure source 18 via a valve 20. The fluid supply tube 16 is also in flow communication with a bleed path 22, which in this embodiment is defined by a tube 24 in flow communication fluid supply tube 16 via valve 20.

Figure 2:
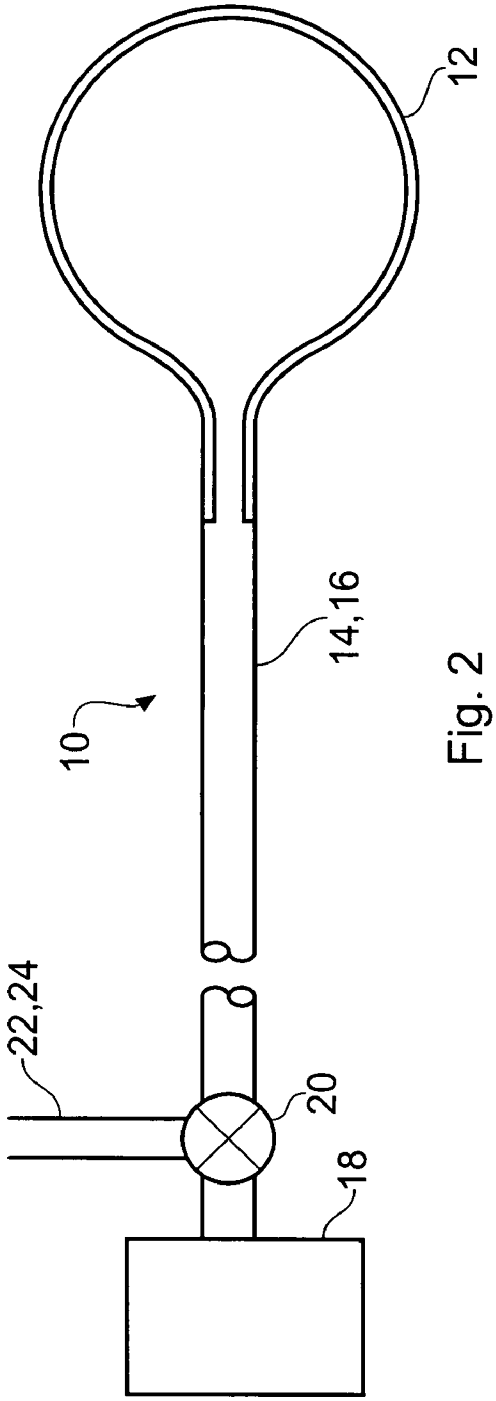
FIG. 2 shows a bracing means as shown in FIG. 1 with the expandable member shown in an expanded state.

In operation, the valve 20 is opened such that fluid from the pressure source 18 is allowed to pass along the fluid supply tube 16. The fluid may be any suitable fluid, including, but not limited to, air. The expandable member 12, which in this embodiment is an inflatable bladder, is pushed out of the end of the support member 14 and inflated, as shown in FIG. 2. When the desired amount of inflation is achieved, the valve 20 is closed. To deflate the bladder the valve 20 is opened, allowing fluid to pass to the bleed tube 24. The bladder will deflate and, if required, is drawn inside the fluid supply tube 16 by some convenient means. This may be achieved by lowering the pressure at the exit to the bleed and/or pressure source. Alternatively this may be achieved by drawing the bladder back into the tube with a draw string attached to the bladder and threaded through to the operator via the fluid supply tube.

Figure 3:
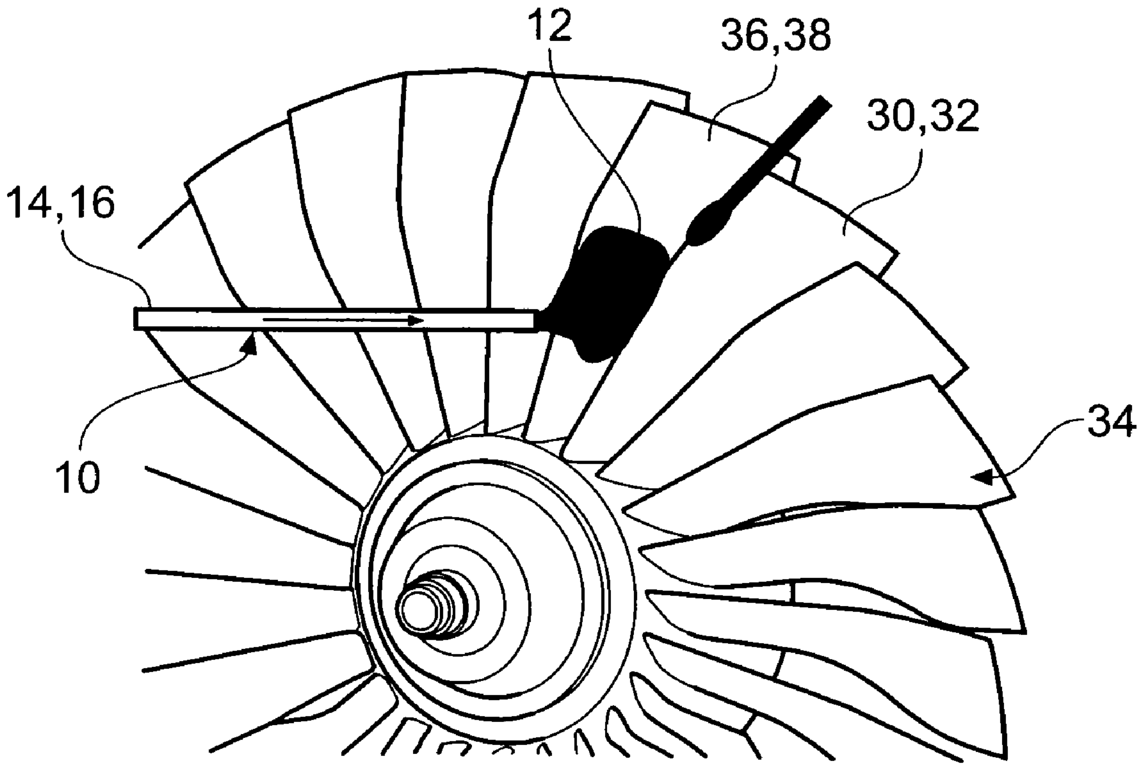
FIG. 3 shows the bracing means as shown in FIG. 1 and FIG. 2 in which the bracing means is shown positioned between two vanes in an annular array of compressor vanes.

Referring now to FIG. 3, the bracing means 10 is intended for supporting a moveably mounted or flexible component 30 during a machining operation. FIG. 3 shows one such scenario where the component 30 is a vane 32 which forms part of an annular array of vanes 34. The array 34 is fitted to an engine, but the casing, shaft and other components of the engine are not shown here for clarity. The bracing means 10 is slid into position between a vane 32 which is to be machined and a support surface 36 which is an adjacent vane 38. The bracing means 10 is adapted to fit between the vane 32 and the adjacent vane 38 such that when the member 12 is expanded it conforms substantially to the shape of the vane 32 and the vane 38, bracing one against the other such that movement and/or flexing of the vane 32 in response to forces arising during the machining operation is resisted by virtue of the bracing of vanes 32,38 by the bracing means 10.

Figure 5:
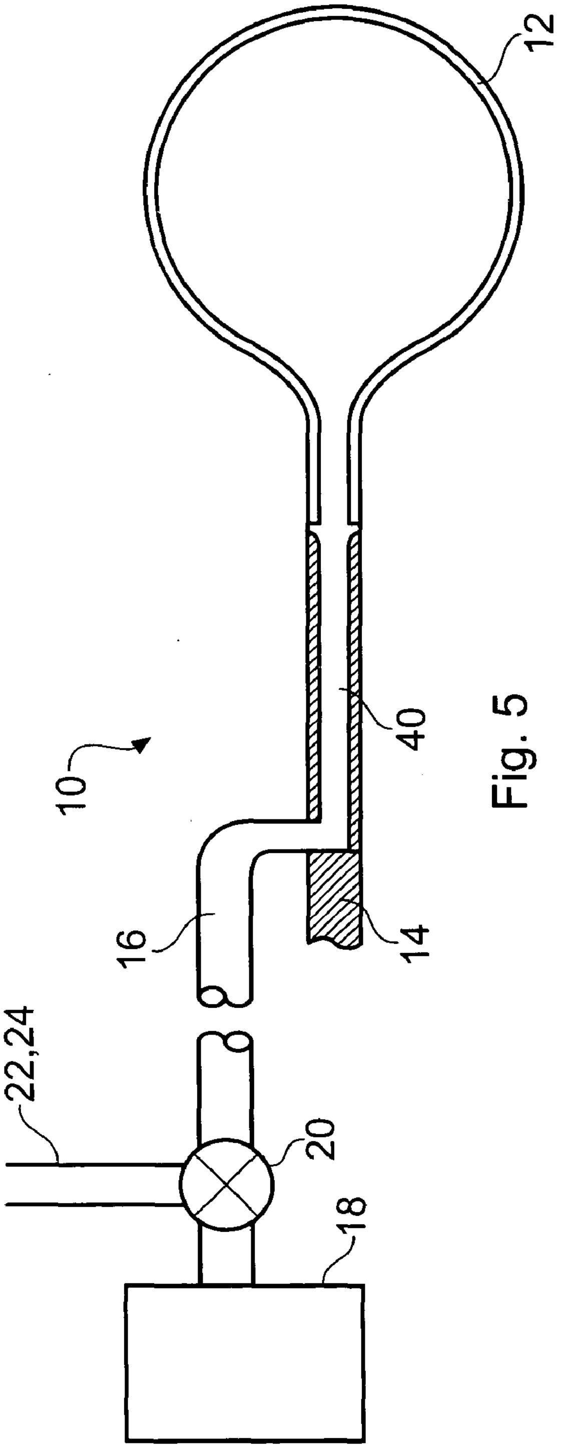
FIG. 5 shows the embodiment of FIG. 4 with the expandable member shown in an expanded state.
Figure 4:
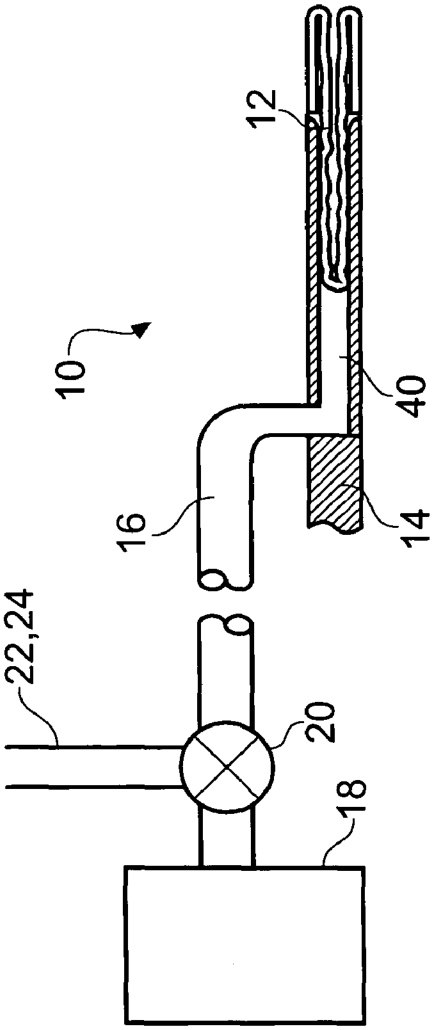
FIG. 4 shows an alternative embodiment of the present invention in which the fluid supply means and support member are separate components, and the expandable member shown in a contracted state.

In an alternative embodiment the support member 14 is not employed as a fluid supply tube 16. Instead a separate fluid supply tube 16 is provided to supply fluid to the expandable member 12. An example of such a configuration is presented in FIGS. 4 and 5. The features of the invention are as discussed previously except the support member 14 is a member configured to provide only structural support for the expandable member 12 and does not provide a passage for the delivery of fluid to the expandable member 12 along its length. A separate fluid supply tube 16 is in flow communication with the expandable member 12 via a passage 40. Inflation, deflation and retraction of the bladder is as previously discussed for the embodiment of FIGS. 1 and 2.

The fluid used to inflate the member 12 may be air, water, oil or an inert gas. In some applications it may be beneficial to use an inert gas in case the bladder is punctured, thereby supplying inert gas to the area being machined rather than a supply of air, water or oil, which may introduce a fire hazard and/or be deleterious to the machining operation.

In a further embodiment the bladder is made of a semi permeable material and the fluid is supplied under pressure during the machining operation such that the fluid leaks through the material and floods the machining area. This has particular advantage where there is a risk of fire and the supply of an inert gas would act to inhibit ignition. Alternatively if it is required to supply lubricant to the surfaces being machined, the present invention will enable the supply of a lubricant to the machining area via the permeable material.

In another embodiment the bracing means is configured to react in response to varying forces arising during the machining operation. The bracing means partly comprises a control system which monitors the fluid pressure, compression and/or movement of the expandable member and adjusts the fluid pressure accordingly to inhibit further movement of the component relative to the support surface. Hence when it is sensed that the bladder is being compressed more than expected, perhaps because extra force is being applied to the component from the machining operation, or because the component is more flexible than expected, the supply pressure is increased. Conversely, if it is sensed that the bladder is over-inflating and hence is forcing the blades apart so much that they risk being damaged, the pressure supply can be interrupted and/or reduced appropriately. In this way the position of the blade being machined can be kept constant relative to the machining tool and hence the possibility of a successful machining operation are improved.

The invention claimed is:

1. A method for treating a surface of a component, the method comprising the steps of:

inserting a bracing means between the component and an adjacent component;

expanding a flexible expandable member provided on the bracing means between the component and the adjacent component such that the expandable member substantially conforms to the shape of the component and the adjacent component and the bracing means resists movement and/or flexing of the component caused by forces arising during a machining operation; and machining the component, wherein the component:

includes the surface, is one of a blade or a vane of an annular array of blades or vanes in a turbomachine, and the component is moveably mounted or flexible.

2. A method as claimed in claim 1 wherein the expandable member is inflated by supplying the expandable member with a fluid.

3. A method as claimed in claim 2 further comprising controlling a pressure in the fluid to react in response to varying forces arising during the machining operation.

4. A method as claimed in claim 3 further comprising monitoring the pressure and adjusting the pressure to further inhibit movement of the component.

* * * * *